United States Patent

[11] 3,633,941

[72] Inventor Otto Pleier
 St. Clair Shores, Mich.
[21] Appl. No. 19,189
[22] Filed Mar. 13, 1970
[45] Patented Jan. 11, 1972
[73] Assignee The United States of America as represented by the Secretary of the Army

[54] REPLACEABLE SHOCK-MOUNTED KINGPIN INSTALLATION
4 Claims, 5 Drawing Figs.

[52] U.S. Cl. .................................................... 280/440
[51] Int. Cl. ....................................................... B62d 53/08
[50] Field of Search............................................ 280/440, 438, 433

[56] References Cited
UNITED STATES PATENTS

| 2,481,817 | 9/1949 | Bradley et al. | 267/15 |
| 2,920,905 | 1/1960 | Cekada et al. | 280/440 |
| 1,272,486 | 7/1918 | McManis | 280/433 |
| 2,973,210 | 2/1961 | Sandefur | 280/433 |

Primary Examiner—Leo Friaglia
Attorneys—Harry M. Saragovitz, Edward J. Kelly, Herbert Berl and Maxwell V. Wallace ABSTRACT: A kingpin which is replaceable and provides shock attenuation in a vertical, longitudinal and transverse direction especially for transverse direction especially for semitrailers carrying sensitive equipment.

PATENTED JAN 11 1972
3,633,941
SHEET 1 OF 2
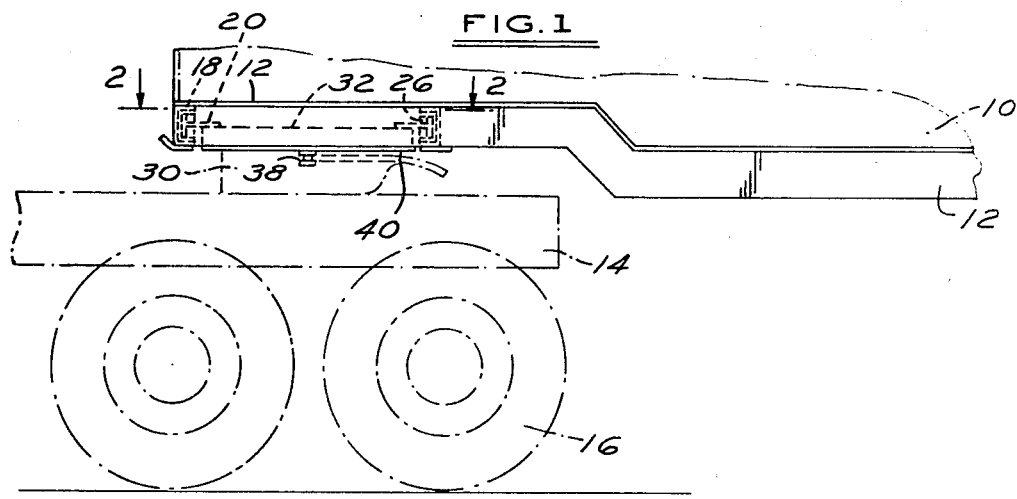
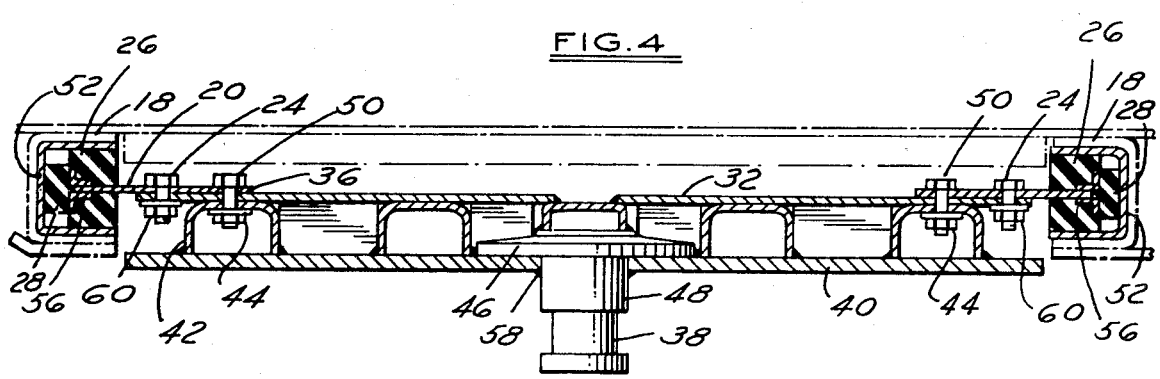
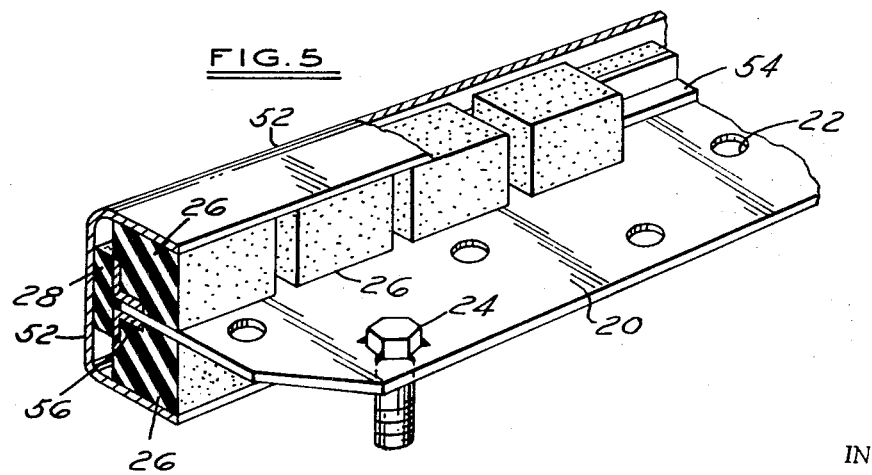
INVENTOR.
OTTO PLEIER
BY
Harry M. Saragovitz, Edward J. Kelly
Herbert Berl & Maxwell V. Wallace
ATTORNEYS

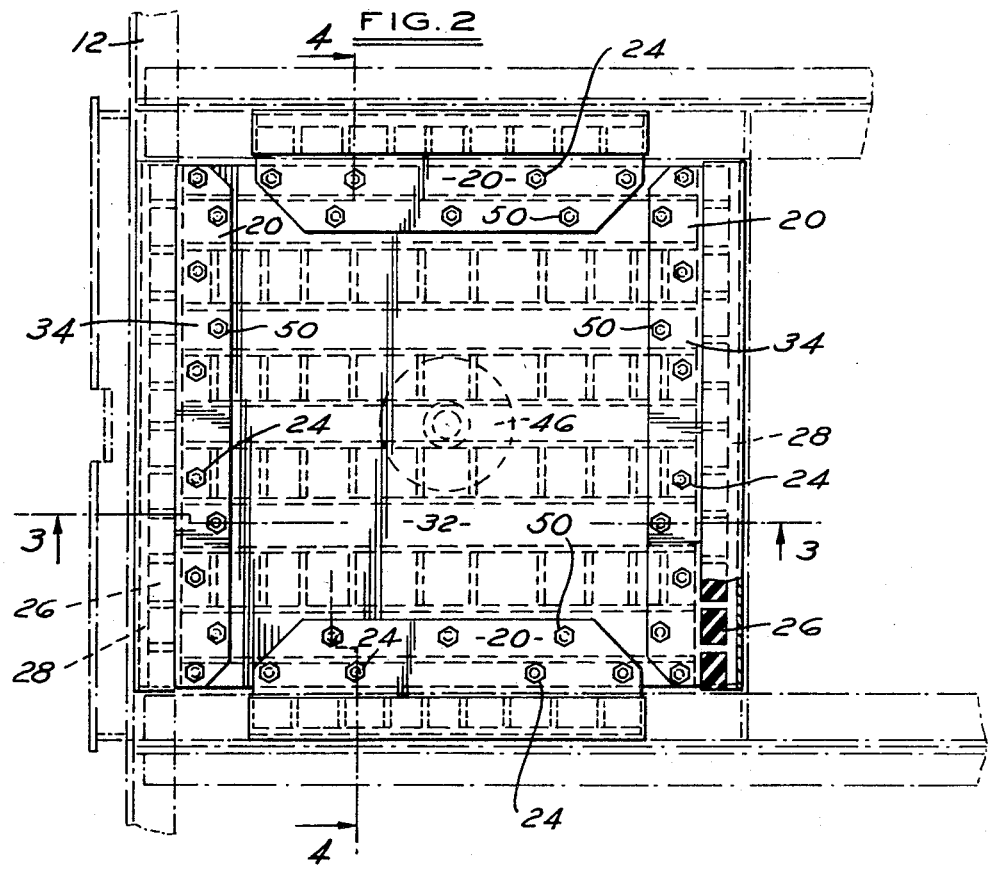
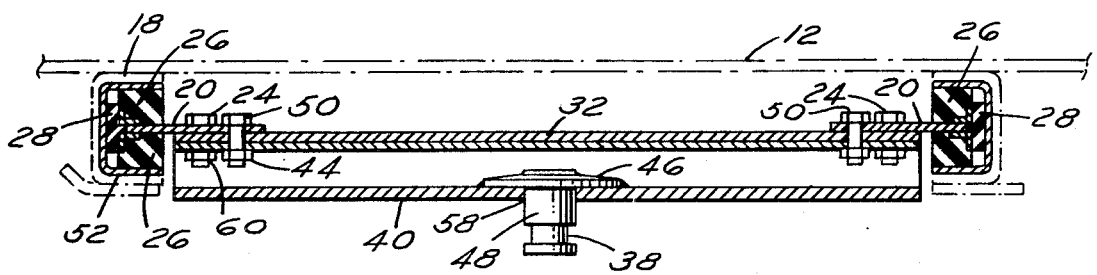

REPLACEABLE SHOCK-MOUNTED KINGPIN INSTALLATION

The invention described herein may be manufactured, used and licensed by or for the Government for governmental purposes without payment to me for any royalty thereon.

This invention relates to what is known in the art as a kingpin, and more particularly to a kingpin that is replaceable, the same providing shock attenuation in a vertical, longitudinal and transverse direction and is especially useful when installed on semitrailers carrying sensitive equipment.

In the past it was the custom to rigidly install a kingpin which could be replaced only through disassembly of the affected welded portion of the substructure of the vehicle. Replacing the kingpin after it is worn out beyond the permissible limit is costly and deadlines the vehicle for a considerable period of time. Shocks, resulting from unevenness of the road surface, are transmitted into the vehicle, and the attenuation provided by the wheel suspension becomes futile to a large degree.

The present disclosure provides means whereby the kingpin assembly may be bolted to the shock insulator assembly of a vehicle and whereby the same is replaceable. There is also provided an elastic mounting of same which provides shock attenuation, the same being accomplished without the use of additional space.

The above and other objects of the invention will appear more clearly from the following more detailed description, and from the drawings wherein;

FIG. 1 is a side elevation showing the replaceable shock-mounted kingpin installed in the undercarriage frame of a semitrailer;

FIG. 2 is a top plan view of a portion of an undercarriage frame showing the kingpin installed;

FIG. 3 is a section taken substantially along line 3—3 of FIG. 2;

FIG. 4 is a section taken substantially along line 4—4 of FIG. 2; and

FIG. 5 is a perspective view showing the transverse and longitudinal shock insulator assemblies.

Referring now to the drawings, the numeral 10 designates a semitrailer having an undercarriage frame 12 and a tractor mount 14 supported by road wheels 16. The undercarriage frame 12 of the semitrailer 10 comprises transverse and longitudinal support members 18, the same being formed to provide a U-shaped girder, or the like, as shown best in FIG. 4 of the drawings, the same being arranged beneath the semitrailer body in substantially square or rectangular configurations, (FIG. 2) of drawings. The means for receiving and supporting the resilient kingpin comprises independent plate members 20 having a plurality of staggered openings 22 therein, the same being adapted to receive a plurality of bolts 24. Plate 20 is held in place in the U-shaped support members 52 by being sandwiched between a plurality of resilient block members 26, the blocks being disposed between members 52 and plate 20, and spaced apart to allow for contraction and expansion. Additional backup resilient rib members 28 rest against the inside of U-shaped support member 52, while steel strips 54, 56, receive the rear edge of plate 20 where the same abuts against resilient rib member 28, (FIG. 5) of drawings.

Tractor coupling frame 14 has mounted thereon a standard fifth wheel assembly 30.

The kingpin assembly per se comprises a rectangularly shaped plate member 32 adapted to seat upon opposed short support plates 20 and long opposed sideplates 34, the same having drilled therein a plurality of openings 36 to align with openings 22 in support plates 20 to receive bolts 24 to secure plate member 32 to support plates 20. To support the kingpin 38, an additional rectangularly shaped plate member 40, is provided, the same having secured thereto a plurality of spaced apart U-shaped channel members 42 having the opposed end channel members pierced to receive bolts 50 and nuts 44 to secure plate member 40 to plate 32. The kingpin 38 being supported by lower plate 40 consists of a stud member having an enlarged head member 46 and a reduced portion 48 which protrudes down through an opening 58 in plate 40 and is welded to plate 40, and has a lower portion adapted to seat in female coupling 30 of tractor frame 14 and couple the semitrailer 10 to the tractor hitch 30.

The manner in which the device operates is as follows:

The device per se is a built-up structure and when completely assembled the same is supported within four-channel members 18 which are an integral part of the frame or subbody structure 12 of semitrailer 10.

The shock insulating portion comprises four separate sections consisting of two longitudinal and two transverse shock isolator assemblies, FIG. 5, each consisting of one jacket or U-shaped support member 52, one plate 20, two angles 54, 56, 24 rubber pads 26, for the transverse, and 18 rubber pads 26, for the longitudinal isolators, and 12 rubber pads 28, for the transverse, and nine rubber pads 28, for the longitudinal isolators, the same being inserted into the channels 52, which are part of the subbody structure. The rubber pads are intended for attenuation of motion in the vertical, longitudinal and transverse direction.

The kingpin or upper fifth wheel plate assembly, FIG. 3, consists of the kingpin 38, upper plate 32, lower plate 40, a plurality of reinforcing channels 42, which are welded together. This assembly is attached to the four shock isolator assemblies, FIG. 5, by means of bolts 24, 50, nuts 44, 60, and washers, through the boltholes 22 in the four shock isolator assemblies and the upper fifth wheel plate assembly. Once assembled the kingpin assembly is ready for interlocking with the fifth wheel plate of the towing vehicle. The reverse operations apply when it is necessary to remove the kingpin assembly and replace same.

With the instant-type pin there is less liability for breakage inasmuch as its unique construction provides shock attenuation in a vertical, longitudinal and transverse direction. Here the kingpin assembly is bolted to the shock insulator assembly of a vehicle and provides an electric mounting of same which provides shock attenuation. In addition to being easily replaceable, its main purpose is to attenuate shock caused by unevenness of the road surface which is especially important when sensitive equipment is transported in the vehicle.

I wish it to be understood that I do not desire to be limited to the exact details of construction shown and described, for obvious modifications will occur to a person skilled in the art.

I claim:

1. In combination with a trailer, a vehicle kingpin assembly for connecting the trailer to a tractor, comprising:
   a trailer having an under frame therebeneath,
   U-shaped transverse and longitudinal support members formed integrally with said under frame and facing in opposed relationship to each other,
   shock isolator assemblies adapted to be inserted within said U-shaped transverse and longitudinal support members in opposed relationship to each other; and
   a fifth wheel kingpin plate assembly detachably supported upon said shock isolator assemblies.

2. The combination as set forth in claim 1, wherein:
   said shock isolator assemblies each comprises a jacket member adapted to receive a plurality of resilient pad members, angle members in opposed relationship to each other abutting against said resilient pad members, a plate member having a plurality of staggered boltholes therein adapted to be held between said opposed angle members, and
   a plurality of resilient pad members located above and below said plate member within said jacket member.

3. The combination as set forth in claim 1, wherein
   said fifth wheel plate assembly comprises a pair of opposed plate members having a plurality of channel members interposed therebetween to hold said plates in interlocked relationship,
   boltholes in the upper of said opposed plate members to receive bolts to connect said plate assembly to the shock isolator assembly, and a kingpin supported rigidly within the lower of said opposed plate members.

4. In combination with a trailer, a vehicle kingpin assembly for connecting the trailer to a tractor, comprising:

a trailer having an under frame therebeneath, transverse and longitudinal support members formed integrally with said under frame in opposed relationship to each other, a shock isolator assembly comprising a jacket member adapted to receive a plurality of resilient pad members to abut against the rear of said jacket member, opposed angle members adapted to abut against said resilient pad member, a plate member having a plurality of boltholes therein, adapted to be sandwiched between said opposed angle members and having its rear edge abutting against said plurality of resilient pad members, and having additional resilient spaced apart pad members held above and below said plate member within said jacket member, and a fifth wheel plate assembly comprising a pair of opposed plate members having a plurality of channel members interposed therebetween to hold said plates in interlocked relationship, boltholes in the upper of said plate member to receive bolts to secure said fifth wheel plate assembly to said shock insulator assembly, and a kingpin supported rigidly with the lower of said opposed plate members to secure said trailer to said tractor.

* * * * *